United States Patent
Fwu et al.

(10) Patent No.: US 9,398,551 B2
(45) Date of Patent: Jul. 19, 2016

(54) PERFORMING MULTIPLE TIMING ADVANCE ADJUSTMENTS IN A CARRIER AGGREGATION COMMUNICATION SYSTEM

(75) Inventors: Jong-Kae Fwu, Sunnyvale, CA (US); Huaning Niu, Milpitas, CA (US); Ping Wang, Beijing (CN); Xiangying Yang, Portland, OR (US); Kamran Etemad, Potomac, MD (US)

(73) Assignee: INTEL CORPORATION, Santa Clara, CA (US)

( * ) Notice: Subject to any disclaimer, the term of this patent is extended or adjusted under 35 U.S.C. 154(b) by 67 days.

(21) Appl. No.: 13/994,743

(22) PCT Filed: Sep. 30, 2011

(86) PCT No.: PCT/US2011/054465
§ 371 (c)(1),
(2), (4) Date: Jul. 28, 2014

(87) PCT Pub. No.: WO2012/134534
PCT Pub. Date: Oct. 4, 2012

(65) Prior Publication Data
US 2014/0369322 A1    Dec. 18, 2014

Related U.S. Application Data

(60) Provisional application No. 61/471,042, filed on Apr. 1, 2011.

(51) Int. Cl.
*H04W 56/00* (2009.01)
*H04B 7/04* (2006.01)
(Continued)

(52) U.S. Cl.
CPC ......... *H04W 56/0005* (2013.01); *H04B 7/0456* (2013.01); *H04B 7/0486* (2013.01);
(Continued)

(58) Field of Classification Search
None
See application file for complete search history.

(56) References Cited

U.S. PATENT DOCUMENTS

| 2009/0170498 | A1 | 7/2009 | Venkatasubramanian et al. |
| 2012/0008600 | A1* | 1/2012 | Marinier ............... H04L 5/001 370/336 |

(Continued)

FOREIGN PATENT DOCUMENTS

| CN | 101888648 A | 11/2010 |
| KR | 10-2008-0031347 A | 4/2008 |

(Continued)

OTHER PUBLICATIONS

International Search Report and Written Opinion received for PCT application No. PCT/US2011/054465, mailed on Mar. 13, 2012, 9 pages.

(Continued)

*Primary Examiner* — Thai Nguyen
(74) *Attorney, Agent, or Firm* — Thorpe North & Western LLP

(57) ABSTRACT

Technology for performing multiple timing advances in a carrier aggregation communication system is disclosed. A method comprises communicating a random access preamble from a UE to an eNodeB via a PCell associated with a selected component carrier of the carrier aggregation. A Random Access Response (RAR) is received at the UE from the eNodeB for the PCell. The RAR contains a timing advance adjustment instructing the UE to adjust a timing of a PCell wireless communication. A request is received at the UE to adjust a timing of an SCell communication. A random access preamble is communicated to the UE via the SCell. An RAR is received at the UE from the eNodeB for the SCell to adjust a timing advance of the SCell wireless communication.

30 Claims, 11 Drawing Sheets

(51) Int. Cl.

| | | |
|---|---|---|
| H04B 7/06 | (2006.01) | |
| H04L 5/00 | (2006.01) | |
| H04L 25/02 | (2006.01) | |
| H04L 12/26 | (2006.01) | |
| H04L 12/721 | (2013.01) | |
| H04L 29/06 | (2006.01) | |
| H04W 4/00 | (2009.01) | |
| H04W 24/00 | (2009.01) | |
| H04W 24/02 | (2009.01) | |
| H04W 24/10 | (2009.01) | |
| H04W 28/08 | (2009.01) | |
| H04W 48/10 | (2009.01) | |
| H04W 48/12 | (2009.01) | |
| H04W 52/02 | (2009.01) | |
| H04W 52/14 | (2009.01) | |
| H04W 52/18 | (2009.01) | |
| H04W 72/04 | (2009.01) | |
| H04W 74/08 | (2009.01) | |
| H04L 25/03 | (2006.01) | |
| H04W 28/04 | (2009.01) | |
| H04W 72/00 | (2009.01) | |
| H04W 88/02 | (2009.01) | |
| H04W 88/08 | (2009.01) | |
| H04W 92/20 | (2009.01) | |

(52) U.S. Cl.
CPC ............ *H04B 7/0632* (2013.01); *H04B 7/0639* (2013.01); *H04L 5/003* (2013.01); *H04L 5/0037* (2013.01); *H04L 5/0094* (2013.01); *H04L 25/0206* (2013.01); *H04L 25/0226* (2013.01); *H04L 25/03343* (2013.01); *H04L 43/50* (2013.01); *H04L 45/70* (2013.01); *H04L 65/608* (2013.01); *H04W 4/005* (2013.01); *H04W 24/00* (2013.01); *H04W 24/02* (2013.01); *H04W 24/10* (2013.01); *H04W 28/08* (2013.01); *H04W 48/10* (2013.01); *H04W 48/12* (2013.01); *H04W 52/0216* (2013.01); *H04W 52/146* (2013.01); *H04W 52/18* (2013.01); *H04W 56/0045* (2013.01); *H04W 72/042* (2013.01); *H04W 72/0413* (2013.01); *H04W 72/0453* (2013.01); *H04W 74/0833* (2013.01); *H04L 5/005* (2013.01); *H04L 25/0328* (2013.01); *H04L 2025/03426* (2013.01); *H04L 2025/03802* (2013.01); *H04W 28/048* (2013.01); *H04W 72/00* (2013.01); *H04W 88/02* (2013.01); *H04W 88/08* (2013.01); *H04W 92/20* (2013.01)

(56) References Cited

U.S. PATENT DOCUMENTS

2012/0120821 A1* 5/2012 Kazmi ............... H04W 56/0005 370/252
2012/0243514 A1* 9/2012 Wu .................... H04W 74/0833 370/336

FOREIGN PATENT DOCUMENTS

| KR | 10-2010-0106097 A | 10/2010 |
|---|---|---|
| KR | 10-2011-0019683 A | 2/2011 |
| WO | 2012/134534 A1 | 10/2012 |

OTHER PUBLICATIONS

CATT; Consideration on RACH in CA; 3GPP TSG RAN WG2 Meeting #69; Feb. 12, 2010; 4 pages; Agenda Item 7.1.9; 3GPP TSG RAN WG2 Meeting #69, San Francisco, United States of America, Feb. 22-26, 2010.

Ericsson et al.; Multiple Timing Advance for Carrier Aggregation; 3GPP TSG-RAN WG2 #69—Tdoc R2-101196; Feb. 16, 2010; 3 pages; Agenda Item 7.1.1; 3GPP TSG-RAN WG2 #69, San Francisco, United States of America, Feb. 22-26, 2010.

Nokia Corporation et al.; RACH and carrier aggregation; 3GPP TSG-RAN WG2 Meeting #68bis, R2-100372; Jan. 12, 2010; 4 pages; Agenda Item 7.1.8; 3GPP TSG-RAN WG2 Meeting #68bis, Valencia, Spain, Jan. 18-22, 2010.

Qualcomm Incorporated; Supporting multiple timing advance groups; 3GPP TSG-RAN WG2 meeting #68bis, R2-100423; Jan. 12, 2010; 3 pages; Agenda item 7.1.1; 3GPP TSG-RAN WG2 meeting #68bis, Valencia, Spain, Jan. 18-22, 2010.

ZTE; Comparison of one serving cell and multiple serving cells; 3GPP TSG WG2 #67bis, R2-095668; Oct. 3, 2009; 6 pages; Agenda Item 7.3.1; 3GPP TSG RAN WG2 #67bis, R2-095668, Miyazaki, Japan, Oct. 12-16, 2009.

ZTE; Impact analysis of multiple TA; 3GPP TSG RAN WG2 #68bis, R2-100308; Jan. 12, 2010; 4 pages; Agenda Item 7.1.1; 3GPP TSG RAN WG2 #68bis, Valencia, Spain, Jan. 18-22, 2010.

3GPP; 3rd Generation Partnership Project; Technical Specification Group Radio Access Network; Evolved Universal Terrestrial Radio Access (E-UTRA); Requirements for support of radio resource management; 3GPP TS 36.133 v10.0.0; Oct. 2010; 389 pages; Release 10.

3GPP; 3rd Generation Partnership Project; Technical Specification Group Radio Access Network; Evolved Universal Terrestrial Radio Access (E-UTRA); Physical channels and modulation; 3GPP TS 36.211 v10.0.0; Dec. 2010; 103 pages; Release 10.

3GPP; 3rd Generation Partnership Project; Technical Specification Group Radio Access Network; Evolved Universal Terrestrial Radio Access (E-UTRA); Multiplexing and channel coding; 3GPP TS 36.212 v10.0.0; Dec. 2010; 72 pages; Release 10.

3GPP; 3rd Generation Partnership Project; Technical Specification Group Radio Access Network; Evolved Universal terrestrial Radio Access (E-UTRA); Physical layer procedures; 3GPP TS 36.213 v10.0.0; Dec. 2010; 98 pages; Release 10.

3GPP; 3rd Generation Partnership Project; technical Specification Group Radio Access Network; Evolved Universal Terrestrial Radio Access (E-UTRA); Physical layer; Measurements; 3GPP TS 36.214 v10.0.0; Dec. 2010; 13 pages; Release 10.

3GPP; 3rd Generation Partnership Project; Technical Specification Group Radio Access Network; Evolved Universal Terrestrial Radio Access (E-UTRA); Medium Access Control (MAC) protocol specification; 3GPP TS 36.321 v10.0.0; Dec. 2010; 53 pages; Release 10.

3GPP; 3rd Generation Partnership Project; Technical Specification Group Radio Access Network; Evolved Universal Terrestrial Radio Access (E-UTRA); Radio Resource Control (RRC); Protocol specification; 3GPP TS 36.331 v10.0.0; Dec. 2010; 276 pages; Release 10.

Nokia Corp et al, "RACH and carrier aggregation", 3GPP TSG-RAN WG2 R2-100372, Discussion and Decision, Jan. 2010, pp. 4, Meeting 68bis, Agenda 7.1.8, Valencia, Spain.

* cited by examiner

PERFORMING MULTIPLE TIMING ADVANCE ADJUSTMENTS IN A CARRIER AGGREGATION COMMUNICATION SYSTEM

CLAIM OF PRIORITY

Priority of U.S. Provisional patent application Ser. No. 61/471,042 filed on Apr. 1, 2011 is claimed, and is hereby incorporated by reference.

BACKGROUND

As the use of mobile wireless devices, such as smart phones and tablet devices, becomes more ubiquitous, the demands on the limited amount of radio frequency spectrum used by those devices also increases, resulting in wireless network congestion in the licensed spectrum. In addition, the increased use of high bandwidth applications such as audio and video streaming can increase demands beyond the capability of the available spectrum. This is especially true in high density and high use locations such as large cities and universities. One projection estimates a growth of 20 times in mobile internet traffic from 2010 to 2015.

One way of increasing bandwidth in wireless devices is through the use of carrier aggregation, in which multiple carriers having different frequencies are aggregated to form a virtual wideband connection for a wireless device. However, transmitting and receiving over different frequencies can create a number of challenges. For example, the different carriers may travel different paths between the wireless device and the base station or access point. The distinct propagation paths between different carriers can create timing differences in the reception of the signals. This can be disadvantageous in wireless systems that combine data for multiple devices in a single signal, such as in systems that use Orthogonal Frequency Division Multiple Access (OFDMA).

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1A:
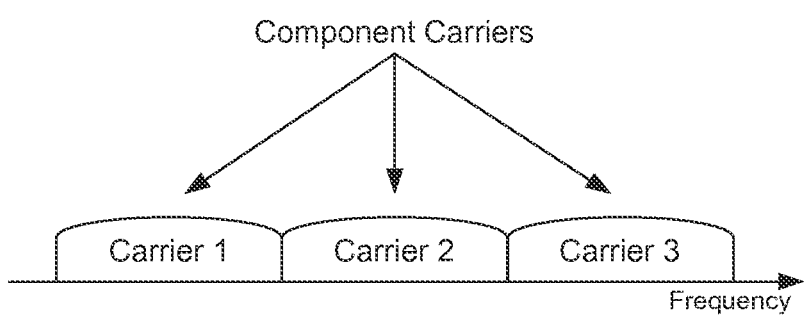
FIG. 1a is a block diagram illustrating multiple contiguous component carriers in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

As used herein, the term"substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

An exponential increase in the amount of wireless data transmission has created congestion wireless networks using licensed spectrum to provide wireless communication services for wireless devices such as smart phones and tablet devices, to name a few. The congestion is especially apparent in high density and high use locations such as urban locations and universities.

One technique for providing additional bandwidth capacity to wireless devices is through the use carrier aggregation of multiple smaller bandwidths to form a virtual wideband channel at a wireless device. Carriers are signals in permitted frequency domains onto which information is placed. The amount of information that can be placed on a carrier is determined by the aggregated carrier's bandwidth in the frequency domain. The permitted frequency domains are often limited in bandwidth. The bandwidth limitations become more severe when a large number of users are simultaneously using the bandwidth in the permitted frequency domains. Carrier aggregation enables multiple carrier signals to be simultaneously communicated between a user's wireless device and a base station. Multiple different carriers can be used. In some instances, the carriers may be from different permitted frequency domains. This provides a broader choice to the wireless devices, enabling more bandwidth to be obtained. The greater bandwidth can be used to communicate bandwidth intensive operations, such as streaming video or communicating large data files.

FIG. 1a illustrates an example of carrier aggregation of continuous carriers. In the example, three carriers are contiguously located atone a frequency band. Each carrier can be referred to as a component carrier. In a continuous type of system, the component carriers are located adjacent one another and are typically located within a single frequency band. A frequency band is a selected frequency range in the electromagnetic spectrum. Selected frequency bands are designated for use with wireless communications such as wireless telephony. Certain frequency bands are owned or leased by a wireless service provider. Each adjacent component carrier may have the same bandwidth, or different bandwidths. A bandwidth is a selected portion of the frequency band. Wireless telephony has traditionally been conducted within a single frequency band.

Figure 1B:
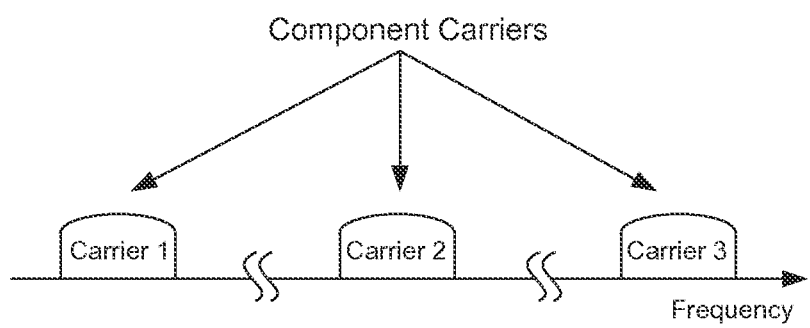
FIG. 1b is a block diagram illustrating multiple non-contiguous component carriers in accordance with an example.

FIG. 1b illustrates an example of carrier aggregation of non-continuous component carriers. The non-continuous component carriers may be separated along the frequency range. Each component carrier may even be located in different frequency bands. The ability to use component carriers in different frequency bands enables more efficient use of available bandwidth and increases the aggregated data throughput.

At a wireless device, such as a User Equipment (UE), the device can be configured to communicate with a base station (eNodeB) via a selected carrier. This selected carrier can be designated as a first component carrier. Each component carrier at the UE can appear as a serving cell at the UE, as defined by the Third Generation Partnership Project (3GPP) Long Term Evolution (LTE) Release 8 specification. The serving cell associated with the component carrier that is configured with the full control channels/signals by the eNodeB to the UE can be referred to as a Primary Serving Cell (PCell). The primary cell is typically the first component carrier set up for a UE. However, any component carrier can be designated as the PCell. If additional component carriers are needed at the UE to provide a desired bandwidth, quality of service, or other desired feature, additional component carriers can be assigned to the UE by the eNodeB via the radio resource control (RRC) signaling. Each additional component carrier can be configured and associated with a Secondary Serving Cell (SCell) at the UE. In one embodiment, the secondary serving cell can have no physical uplink control channel (PUCCH) transmission to the UE based on the current LTE Rel-8/9/10 specifications.

When a UE is turned on, or activated, the distance between the UE and the eNodeB causes a propagation delay in the signal. To account for the propagation delay, the transmit timing at the UE can be adjusted. This is typically accomplished by transmitting a signal from the UE to the eNodeB and receiving a response from the eNodeB that instructs the UE how much the transmit timing at the UE needs to be adjusted (forwards or backwards) based on how closely the signal from the UE correlates with a timing advance signal at the eNodeB.

In the 3GPP LTE specification Releases 8, 9, and 10 designate that the signal transmitted from the BE includes a random access preamble. The random access preamble can be assigned at the Medium Access Control (MAC) layer in the uplink and communicated on a Random Access Channel (RACH) such as the Physical Random Access Channel (PRACH). This signal transmitted by the BE is received at the eNode B and correlated with a timing reference signal. A determination is made by the eNodeB how much the timing advance of the transmission of the carrier signal at the UE will need to be adjusted. The timing advance may be adjusted in a positive or negative direction.

The eNodeB can then send a Random Access Response (RAR). The LTE specification indicates that the RAR should includes an initial 11-bit timing advance, as defined in Section 6.2.3 of TS 36.32.1 v. 10.2. The UE can then adjust the timing of its transmissions based on the number received (between 0 and 1024). The BE timing is to be adjusted with a relative accuracy better than or equal to +/−4 Ts, where Ts=1/(15,000*2048) seconds. The change in transmission timing at the UE is referred to as a timing advance (TA) adjustment. After the initial synchronization from the RACH, the eNodeB can use other uplink signals such as the cyclic prefix or the uplink reference signal for synchronization tracking and/or updating.

Currently, in the 3GPP LTE Release 10 specification, only one timing advance value is supported with the following two restrictions for the BE configured with the carrier aggregations: (1) the timing advance is based on synchronization to the PCell; and (2) no RACH procedure is allowed on the SCell. The use of multiple carrier components of different frequency bands can add additional complications in setting up a downlink and uplink connection with an eNodeB. In 3GPP LTE Releases 8, 9, and 10, when a UE is turned on and configured with the carrier aggregations, the initial random access for uplink carrier aggregation is initiated from the uplink PCell only. Both the uplink PCell and SCell(s) share the same single timing advance (TA), which is maintained on the PCell. Therefore, only one single timing advance in the uplink is supported, even when multiple component carriers in the same band or different frequency bands are aggregated.

Figure 2:
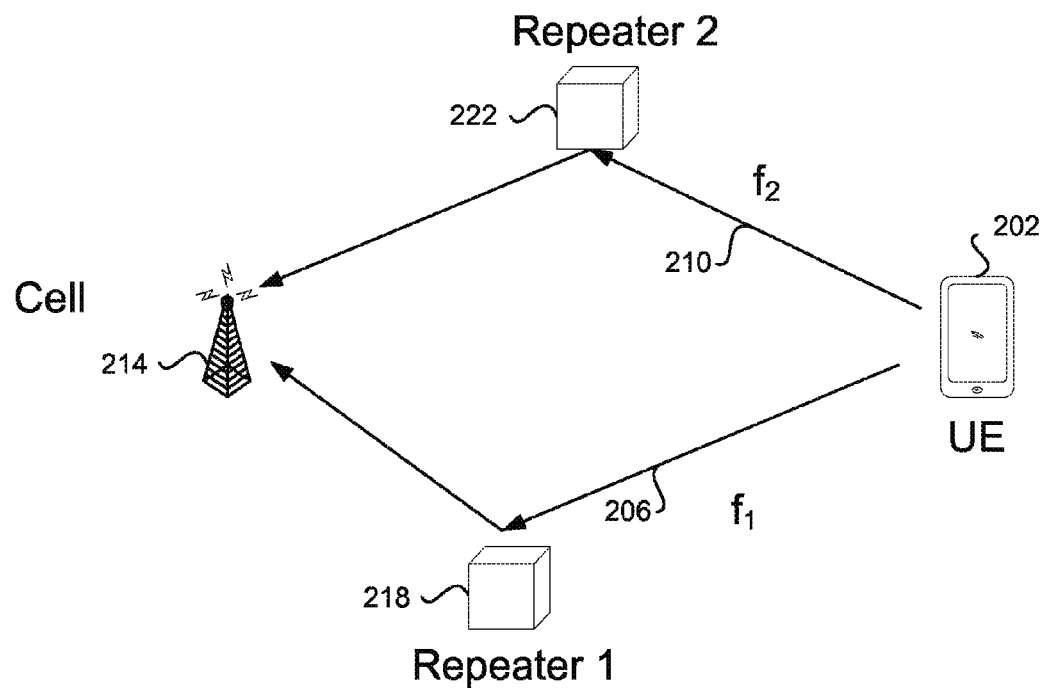
FIG. 2 is a block diagram illustrating a communication system using frequency selective repeaters in accordance with an example.
Figure 3:
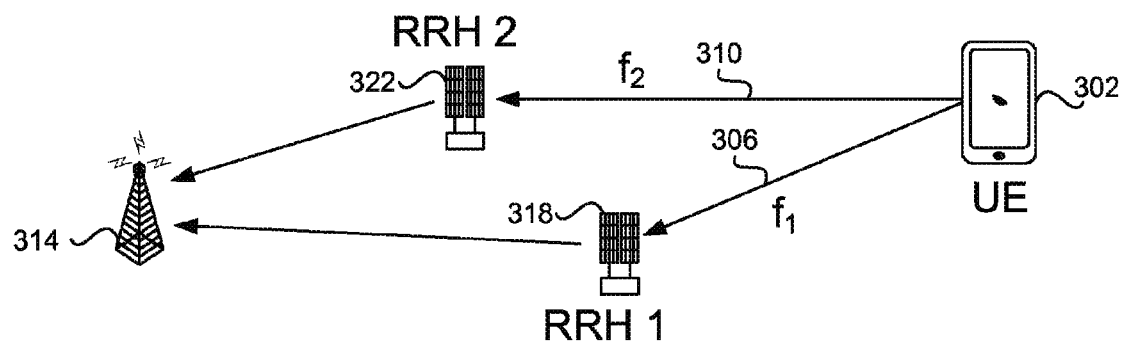
FIG. 3 is a block diagram illustrating a communication system using frequency selective remote radio heads in accordance with an example.
Figure 4:
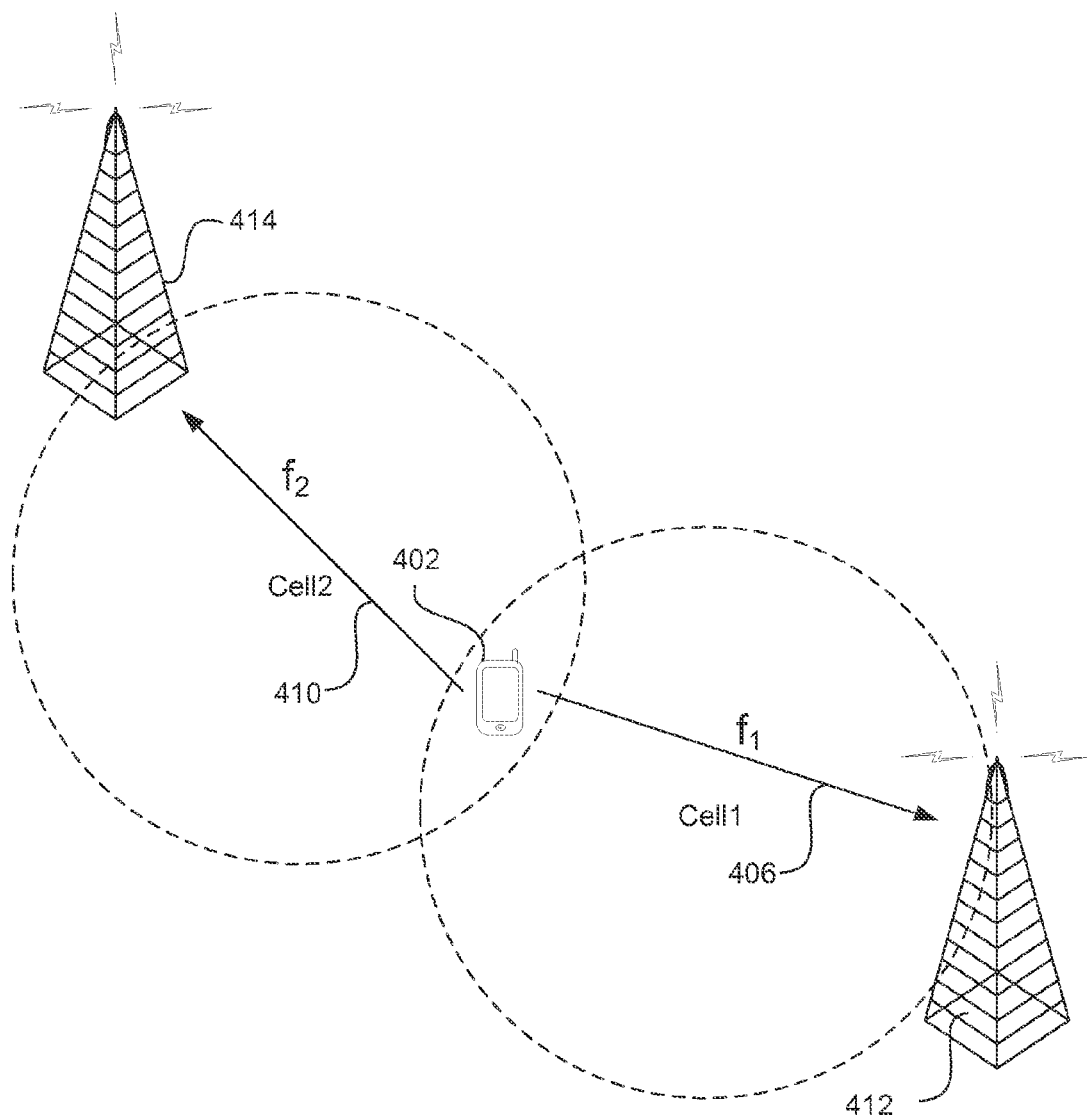
FIG. 4 is a block diagram illustrating a communication system using multiple Coordinated Multipoint (CoMP) base stations in accordance with an example.

There are several scenarios where separate timing advance adjustments per component carrier may be used to significantly increase the efficiency of carrier aggregation using multiple component carriers. Three different scenarios are illustrated in FIGS. 2-4 that may cause different component carriers to travel significantly different propagation paths and cause different propagation delays. The reception and decoding of information carried by the component carriers can be significantly enhanced with the use of a timing advance adjustment for one or more SCells.

FIG. 2 provides an example illustration in which a UE 202 is configured with a PCell associated with a first component carrier signal 206 transmitted at a first frequency $f_1$. An SCell is associated with a second component carrier signal 210 transmitted at a second frequency $f_2$. The first component carrier signal may be relayed to the eNodeB 214 by a first frequency selective repeater 218. The second component carrier signal may be relayed to the eNodeB by a second frequency selective repeater 222. Each repeater 218, 222 may be positioned a different distance from the eNodeB 214. Depending on the location of the UE relative to each repeater and the distance of each repeater relative to the eNodeB, the distance traveled by the first component carrier signal 206 may be substantially different than the distance traveled by the second component carrier signal 210. If the arrival timing of the component carrier signals at the eNodeB is greater than $4f_s$, then the timing is not within the 3GPP LTE specification standard. Thus, there may be a need to perform a timing advance adjustment for each component carrier.

Similarly, FIG. 3 provides an example in which a UE 302 transmits a first component carrier signal 306 having a first frequency $f_1$ and a second component carrier signal 310 having a second frequency $f_7$. The first component carrier may be received by a first frequency selective remote radio head (RRH) 318 for initial baseband processing and then communicated to a base band unit (BBU) or eNodeB 314 for additional processing and communication to a network. The second component carrier may be received by a second remote radio head 322 and communicated to the BBU/eNodeB 314. As in FIG. 2, the position of the UE relative to each RRH, and the position of each RRH relative to the eNodeB 314 can change the path length of each component carrier signal and create a potential need for individual timing adjustment for each component carrier.

FIG. 4 provides an additional example, wherein a UE 402 is configured to communicate with a first eNodeB 410 and a second eNodeB 412 using Coordinated Multipoint (COMP) communication. The first and second eNodeBs can be connected by a high speed optical fiber to enable communications between the eNodeBs to be coordinated. In this example, the UE 402 communicates via a first component carrier signal 406 having a first frequency $f_1$ and a second component carrier signal 410 having a second frequency $f_2$. The first component carrier can be received by eNodeB 412 and the second component carrier can be received by eNodeB 414. In the context of uplink CoMP, different cells can receive the UE's signals on any component carrier. The timing advance could therefore be chosen to target any of the cells. Thus, different carriers could have different timing advance commands. As in FIGS. 2 and 3, the position of the UE relative to each eNodeB can change the path length of each component carrier and create a potential need for individual timing adjustment for each component carrier.

In one embodiment, a new timing adjustment can be established for one or more SCells using the RACE procedure with the 11-bit timing advance command. Alternatively, in scenarios where a reasonable synchronization has been achieved, the timing advance adjustment can be accomplished without the need of an additional RACH procedure in one or more SCells. A determination as to what stands as a reasonable synchronization may depend on environmental conditions and system design. A reasonable synchronization may be deemed to have been achieved when the timing advance adjustment is a range of less than $5*T_s$ to less than $100*T_s$. However, these values are only provided as examples and are not intended to be limiting. Multiple small timing advances can be performed in lieu of a single large timing advance, as can be appreciated. This will be discussed more fully below.

Figure 5:
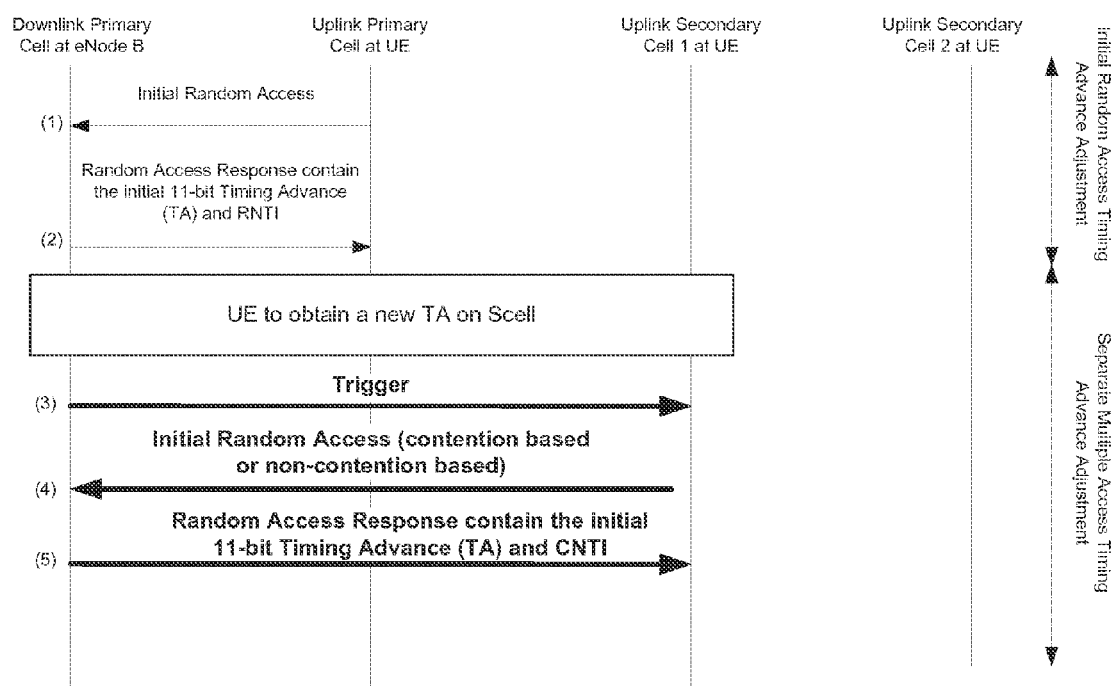
FIG. 5 is a flowchart depicting a process for performing multiple timing advances of component carriers in a carrier aggregation communication system in accordance with an example.

FIG. 5 provides a flow chart depicting an example of a procedure to perform an 11-bit timing advance for a PCell and one or more SCells. In step (1), when a UE is first powered on then an initial random access preamble is communicated from the UE to the eNodeB. As previously discussed, the random access preamble can be assigned at the Medium Access Control (MAC) layer in the uplink and communicated on a Random Access Channel (RACH) such as the Physical Random Access Channel (PRACH). This signal is received at the eNode B and correlated with a timing reference signal. As previously discussed, the first component carrier setup for the UE may be referred to as the PCell, as shown in FIG. 5. However, any cell at the UE may be designated as the PCell.

In step (2), the eNodeB will reply in response to the random access preamble with the Random Access Response. The RAR can be communicated on the Physical Downlink Shared Channel (PDSCH) and addressed with a Random Access Radio Network Temporary Identifier (RA-RNTI), which can identify the time-frequency slot in which the preamble was detected. The RAR can convey the identity of the detected preamble, a timing alignment instruction to synchronize subsequent uplink transmissions from the UE, an initial resource grant for transmission of the next uplink message, and an assignment of a Cell-RNTI (C-RNTI). The RAR message can also include a backoff indicator which the eNodeB can set to instruct the UE to back off for a period of time before retrying, a random access attempt. The connection between the UE and the eNodeB can then be setup as detailed in the 3GPP LTE Release 8, 9, and/or 10 specifications.

The eNodeB may instruct the UE to setup one or more SCells to provide additional bandwidth for transmitting and/or receiving signals. The setup procedure for the one or more SCells is also detailed in the 3GPP LTE Release 8, 9, and/or 10 specifications. An SCell may be setup and configured to allow communication between the UE and an eNodeB on a second component carrier. The second component carrier may travel a different distance than the component carrier associated with the PCell. The eNodeB may then determine that the timing of the received communications from the SCell at the UE is substantially off. For example, the communication from the component carrier assigned to the SCell may be received at the SCell with a timing that is off by 5 $T_s$ to several thousand times the value of $T_s$. In step (3), the eNodeB can send a trigger to the HE instructing the UE to perform a RACH process. Alternatively, the trigger may be transmitted any time an additional component carrier is added, regardless of the timing of the SCell communication.

The trigger may be communicated by the eNodeB via a Physical Downlink Control Channel (PDCCH) command, through an Activation MAC CE, or via another desired communication process. The trigger may be communicated by the eNodeB to the UE via a component carrier controlled by the PCell, or a component carrier controlled by the SCell for which the trigger is being sent. The trigger can include a cell identification or timing advance index that allows the UE to identify which SCell the trigger is for. This will be discussed more fully below.

Upon receiving the trigger, step (4) depicts that the UE can send a random access preamble that can be assigned at the Medium Access Control (MAC) layer in the uplink and communicated on a Random Access Channel (RACH) such as the Physical Random Access Channel (PRACH). The random access preamble will be sent on the component carrier of the SCell for which a timing advance adjustment is to be performed. The random access preamble may be sent via a contention based communication scheme or a non-contention based communication scheme. The random access preamble is received at the eNodeB and correlated with a timing reference signal. The time of flight of this signal from the UE to the eNodeB is used to adjust the timing advance for communications from this SCell at the UE. In step (5), the eNodeB will respond with an RAR that is transmitted to the UE. The RAR will contain the 11-bit timing advance command for the SCell. The value of the 11-bit timing advance command is set based on the correlation of the random access preamble that was previously sent in step (4). Thus, the RAR can be communicated to the UE via the PCell or any SCell. Since the eNodeB assigns a dedicated preamble for the RACH procedure on the SCell, the RNTI transmitted with the RAR to the SCell may be ignored by the UE. Alternatively, the RNTI or C-RNTI may not be transmitted when an RAR is communicated to an SCell. In another alternative, (1) an additional RAR format may be defined without the RNTI or C-RNTI; or (2) the existing RAR format can be used with the RNTI fields used as reserved fields.

The example process described in steps (4), (5), and (6) can be repeated for each SCell that is created at the UE, such as SCell 2 shown in FIG. 5. Alternatively, the process may only be performed when the timing of a communication signal from an SCell is determined at the eNodeB to be off by more than a predetermined amount. Each time an SCell is torn down and then rebuilt, it may be desired to adjust the timing advance, as shown in steps (4), (5), and (6). Only in step (4) is it necessary to transmit the communication on a selected path. The random access preamble should be communicated on the path for which the timing advance adjustment is to be performed.

Figure 6:
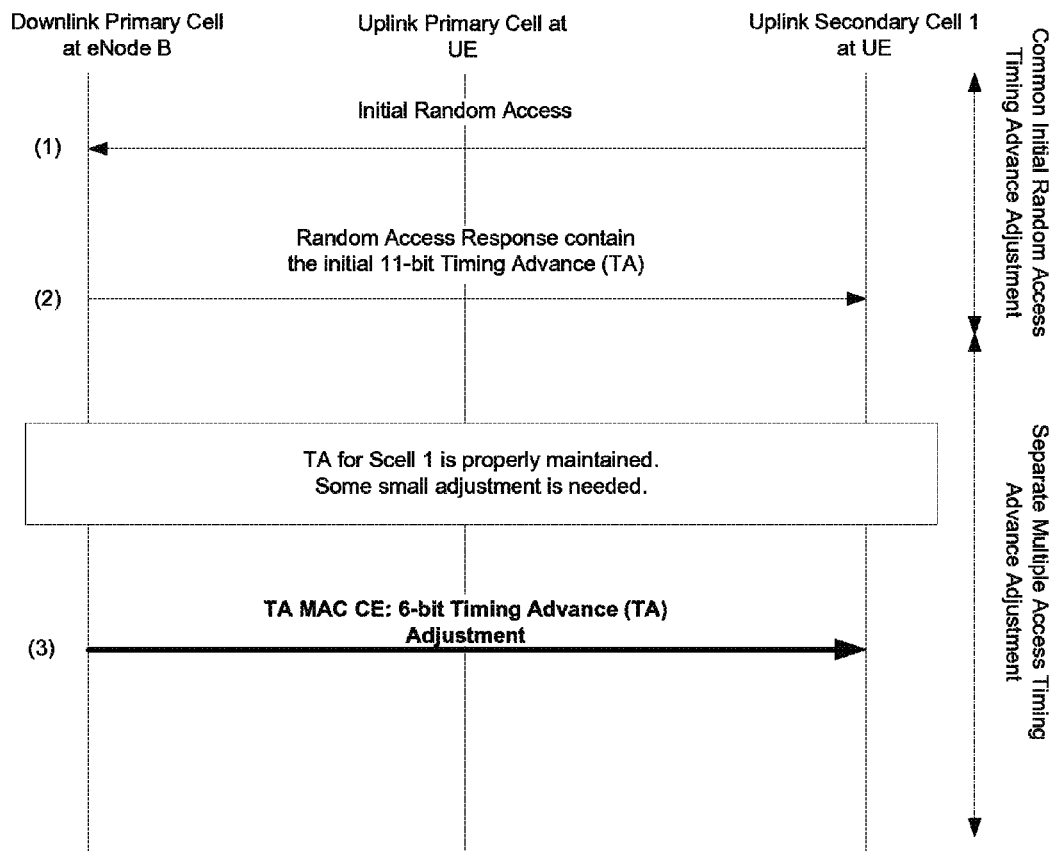
FIG. 6 is a flowchart depicting a process for maintaining the multiple timing advances of the component carriers in FIG. 5 in accordance with an example.

Once a UE has already achieved synchronization with the eNodeB and established a timing advance for one or more SCells, the timing advance between the UE and the eNodeB can be maintained by periodically performing adjustments on the timing advance. FIG. 6 illustrates one example illustration for maintenance of the timing advance for an SCell. Steps (1) and (2) are the same as steps 5 and 6 that were described with respect to FIG. 5.

In one example, to support or maintain multiple timing advances, a single timing advance MAC CE can be transmitted from the UE to each SCell, as illustrated in step (3). The MAC CE can include a 6-bit timing advance value that can be used to make smaller timing advance adjustments than the 11-bit timing advancement value used in the RACH process that was previously described.

The MAC CE can be communicated to each SCell using any desired carrier, such as using the component carrier for the PCell, the component carrier for the SCell for which the timing adjustment will be performed, or a component carrier for another SCell. The MAC CE for the timing advance can include the cell identity information for SCell(s) for which the timing advance is to be performed. When there are multiple timing advances for different SCells, the same MAC CE (with cell identity information) for timing advance maintenance and/or adjustment can be used, which can be a so-called "grouping timing advance".

The timing advance MAC CE can be identified by a MAC Protocol Data Unit (PDU) sub-header which has a fixed size and consists of a single octet. In accordance with one example embodiment, two or more bits can be used to indicate which cell the timing advance adjustment should be applied to. For instance, two reserved bits in the MAC message can be used to indicate the cell index or a unique Timing Advance (IA) index value that is not directly related to the cell index value.

Figure 7:
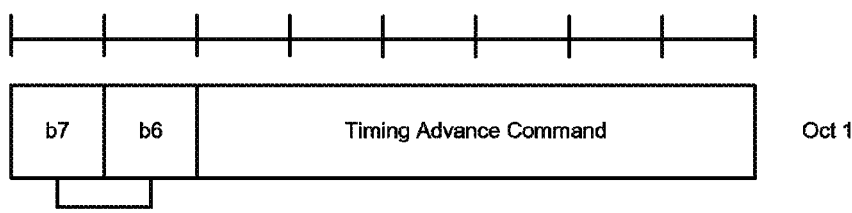
FIG. 7 is a block diagram of an example of a timing advance command Medium Access Control (MAC) Control Element using two bits for a Cell identification in accordance with an example.

FIG. 7 provides an example of a timing advance command MAC CE in a fixed size data octet containing two indicator bits and a 6-bit timing advance command. A Cell Indicator field is used to indicate selected uplink cell(s). The most significant bits are labeled as b7 and b6 in the diagram. The field can be used as follows:

b7b6=00, uplink primary cell (or TA #0);
b7b6=01, the first uplink secondary cell (or TA #1);
b7b6=10, the second uplink secondary cell (or TA #2);
b7b6=11, the third uplink secondary cell or all secondary cells (or TA #3 or reserved);

Timing Advance Command: this field indicates the index value $T_A$ (0, 1, 2, . . . 63) used to control the amount of timing adjustment that the UE will apply to the specified SCell(s). The length of the field is 6 bits.

The example illustrated in FIG. 7 is not intended to be limiting. It is also possible to use other reserved bits to signal which cell the timing advance should be applied to. The use of the MAC CE to perform the 6-bit timing advance may not be limited to instances where a relatively small tuning advance adjustment is needed for a specific cell. In addition, the 6 bit MAC CE can be performed multiple times to achieve a larger timing advance adjustment without the need to perform the 11-bit timing advance adjustment using the RACH procedure.

In another example embodiment, a new timing advance command can be defined that contains a Cell identification (ID) field to signal which cell the current timing advance belongs to. The newly defined Cell ID field can be referred to as an extended timing advance command MAC control element. The extended timing advance command MAC CE can include a second Octet that is appended to the first Octet typically used to send the timing advance command.

Figure 8:
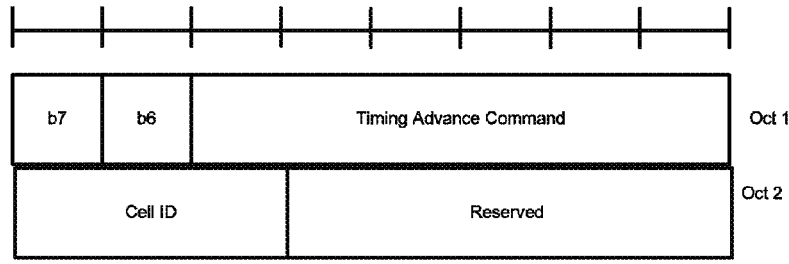
FIG. 8 is a block diagram of an example of a timing advance command Medium Access Control (MAC) Control Element having two octets that includes three bits for a Cell identification in accordance with an example.

FIG. 8 illustrates one example. A first Octet (Oct 1) can include the two reserved bits b7 and b6, along with the 6-bit timing advance command. A second Octet (Oct 2) includes the three most significant bits that can be used to represent the Cell ID. This Extended Timing Advance Command can indicate the timing advance for up to eight different cells or grouping of cells. The remaining bits in the second Octet (Oct 2) can be reserved.

A logical channel ID (LCID) is currently used to identify the timing advance command MAC CE. The value of a new LCID, for example, "11010", can be assigned from the reserved values "01011-11010" to indicate the Extended Timing Advance Command is used for the multiple timing advance adjustments for the PCell and SCell(s), which can distinguish the timing advance command described in the 3GPP LTE Release 8/9.10 from the extended advance command for 3GPP LTE Release 11 and beyond. Alternatively, the existing LCID 11101 for timing advance can be reused, but an additional reserved bit in the MAC CE can be used to indicate that the new extended TA command for the multiple timing advances is being used.

Figure 9:
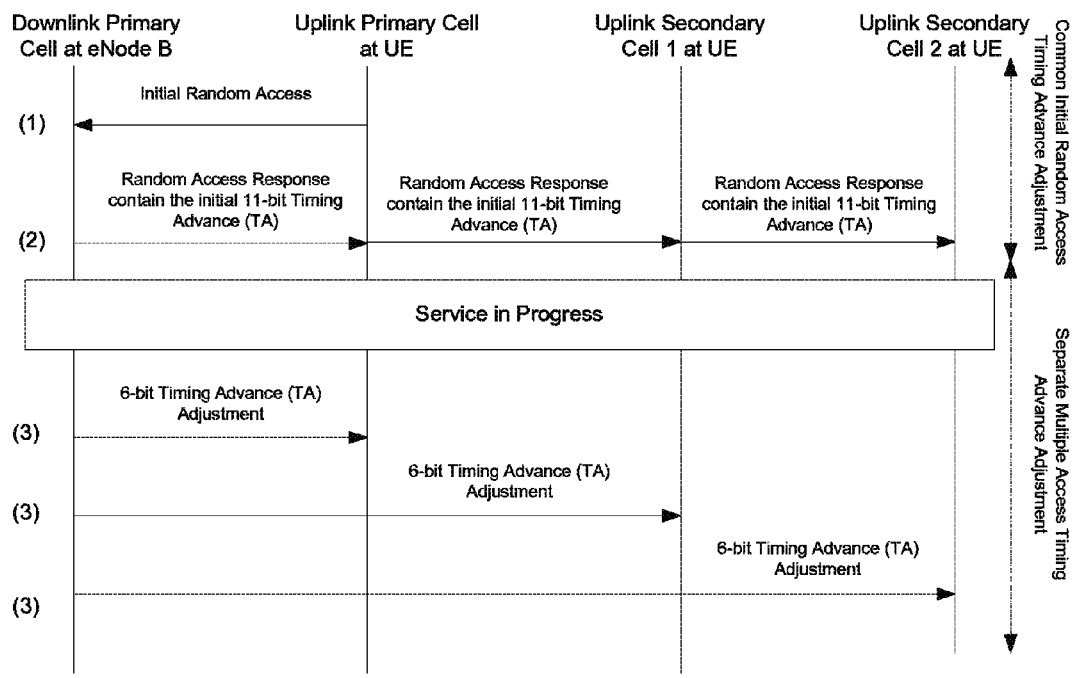
FIG. 9 is a flowchart depicting an additional process for performing multiple timing advances of component carriers in a carrier aggregation communication system in accordance with an example.

FIG. 9 illustrates another example embodiment for applying multiple timing advances at a UE. In this example, the entire RACH procedure is not used at each SCell. In step (1), when a BE is first powered on then an initial random access preamble is communicated from the UE to the eNodeB. As previously discussed, the random access preamble can be assigned at the Medium Access Control (MAC) layer in the uplink and communicated on a Random Access Channel (RACH) such as the Physical Random Access Channel (PRACH). This signal is received at the eNode B and correlated with a timing reference signal.

In step (2), the eNodeB will reply in response to the random access preamble with the Random Access Response containing the 11-bit timing advance command. The value of the 11-bit timing advance command is based on the correlation of the initial random access preamble that is correlated with a reference timer at the eNodeB to determine the amount of timing advance adjustment needed for the PCell based on the propagation distance of the signal from the UE to the eNodeB.

The same RAR containing the 11-bit timing advance command set for the PCell can also be sent to each SCell. The propagation distance between the UE and the eNodeB for each SCell may be different from the propagation distance from the UI to the eNodeB for the PCell, as discussed with respect to FIGS. 2-5.

The difference in propagation distance for the PCell and each SCell can then be compensated for in step (3), wherein at least one 6-bit timing advance adjustment can be performed for each SCell to correct for any timing differences between the PCell and the SCell. The 6-bit timing advance adjustments may be performed as discussed with respect to FIG. 7, using a timing advance command. MAC CE or an extended timing advance command MAC CE. As previously discussed, the RAR and the TA MAC CE or extended TA MAC CE can be sent using the PCell or any of the SCells.

Using the same RAR to perform the timing advance adjustment, followed by performing smaller, individual 6-bit timing adjustments at one or more SCells can be useful in scenarios where the propagation distance between the PCell and the SCell(s) is minimal, such as in a system that uses multiple remote radio heads that are a relatively equal distance from the eNodeB. The 6-bit timing advance adjustment can then be used to correct for relatively small timing differences. As previously discussed, the size of the timing differences for which the 6-bit timing advance adjustment is used can depend on system design requirements, among other factors. The timing differences may be from 5*Ts to more than 100*Ts. In addition, multiple small timing differences can be performed to allow for larger timing differences to be made using the 6-bit timing adjustment.

Figure 10:
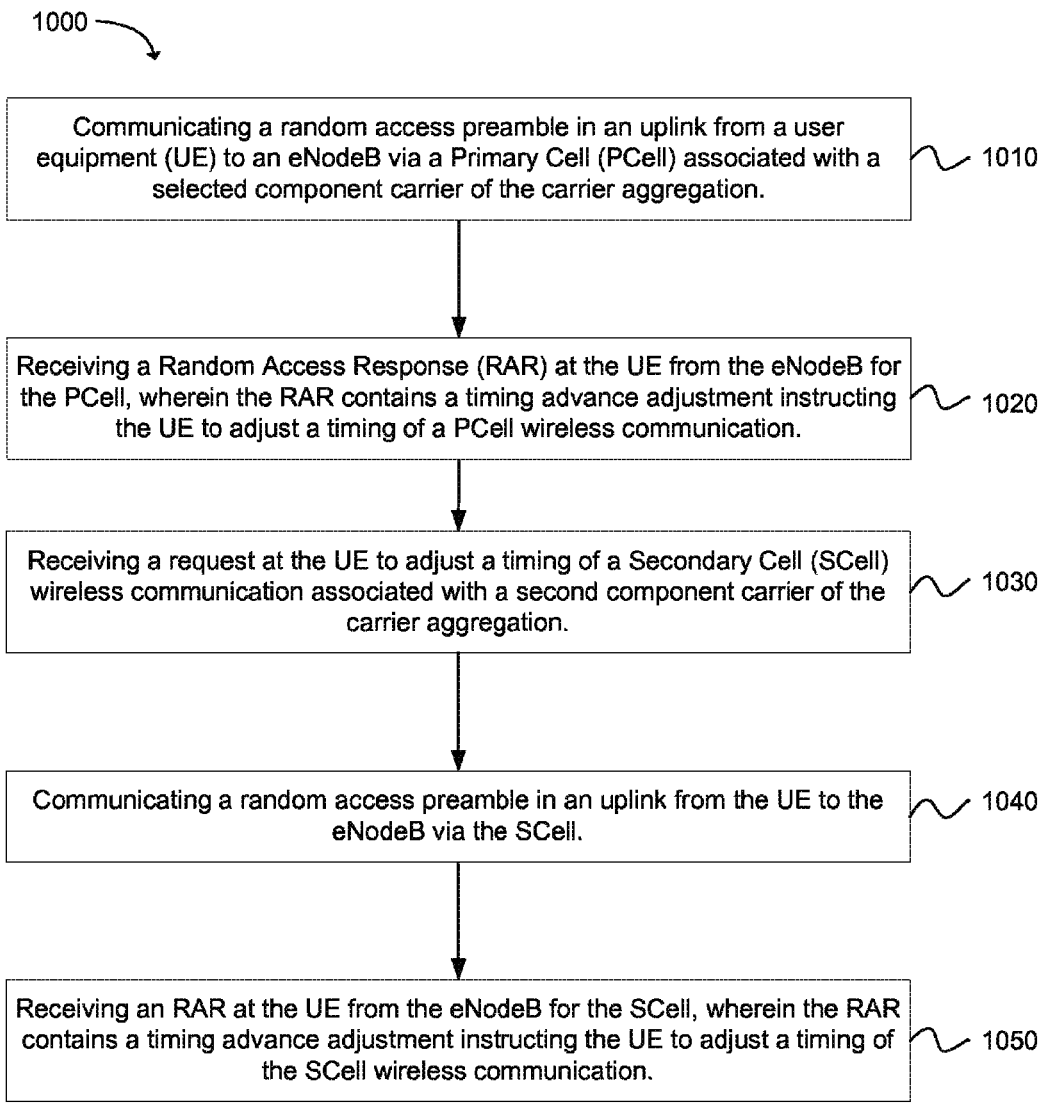
FIG. 10 depicts a flow chart of a method for adjusting a timing of a wireless communication in a wireless communication system having carrier aggregation, in accordance with an example.

In another example embodiment, the flow chart of FIG. 10 depicts a method 1000 for adjusting a timing of a wireless communication in a wireless communication system configured for carrier aggregation. The method comprises communicating 1010 a random access preamble in an uplink from a user equipment (HE) to an eNodeB via a Primary Cell (PCell) associated with a selected component carrier of the carrier aggregation. The selected component carrier may be the first component carrier, or another component carrier that is assigned as the PCell.

The method 1100 further comprises receiving 1020 a Random Access Response (RAR) at the UE from the eNodeB for the PCell. The RAR contains a timing advance adjustment instructing the UE to adjust a timing of a PCell wireless communication. The method 1000 further comprises receiving 1030 a request at the UE to adjust a timing of a Secondary Cell (SCell) wireless communication associated with a second component carrier of the carrier aggregation. A random access preamble is communicated 1040 in an uplink from the UE to the eNodeB via the SCell. An RAR is received 1050 at the UE from the eNodeB for the SCell. The RAR contains a timing advance adjustment instructing the UE to adjust a timing of the SCell wireless communication.

Figure 11:
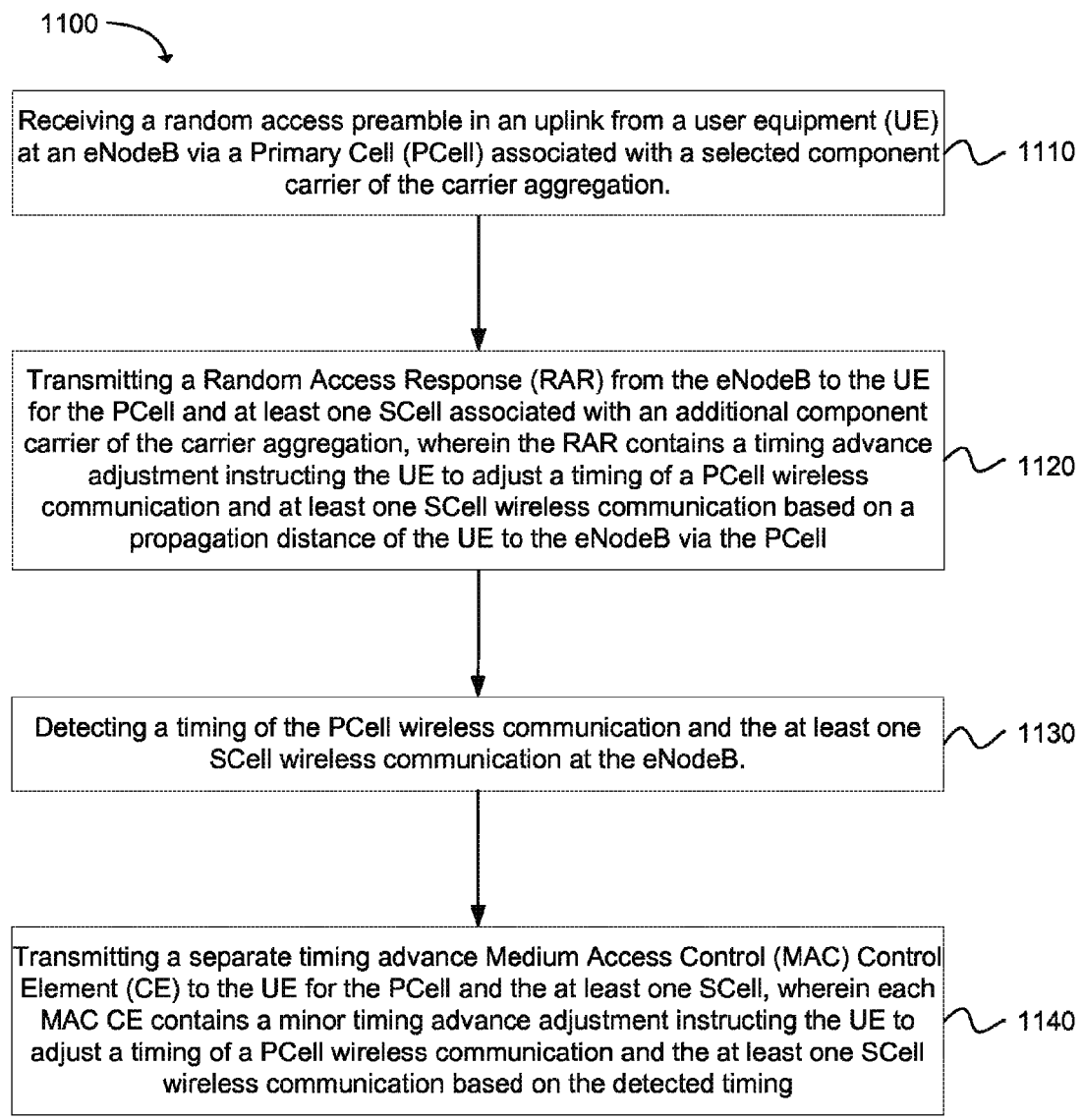
FIG. 11 depicts a flow chart of a method for performing a timing advance adjustment on a wireless communication in a wireless communication system having carrier aggregation, in accordance with an example.

In another example embodiment, the flow chart of FIG. 11 depicts a method 1100 for performing a timing advance adjustment on a wireless communication in a wireless communication system configured for carrier aggregation. The method comprises receiving 1110 a random access preamble in an uplink from a user equipment (UE) at an eNodeB via a Primary Cell (PCell) associated with a selected component carrier of the carrier aggregation. The selected component carrier may be the first component carrier, or another component carrier that is assigned as the PCell.

The method 1100 further comprises transmitting 1120 a Random Access Response (RAR) from the eNodeB to the UE for the PCell and at least one SCell associated with an additional component carrier of the carrier aggregation. The RAR contains a timing advance adjustment instructing the UE to adjust a timing of a PCell wireless communication and at least one Well wireless communication based on a propagation distance of the UE to the eNodeB via the PCell. The method further includes detecting 1130 a timing of the PCell wireless communication and the at least one SCell wireless communication at the eNodeB. A separate timing advance Medium Access Control (MAC) Control Element (CE) is transmitted 1140 to the UE for the PCell and the at least one SCell. Each MAC CE contains a minor timing advance adjustment instructing the UE to adjust a timing of a PCell wireless communication and the at least one SCell wireless communication based on the detected timing. A minor timing advance adjustment is a timing advance adjustment performed with a timing advance command that is less than 11-bits. The minor timing advance adjustment is typically performed using a timing advance command having 6-bits.

Figure 12:
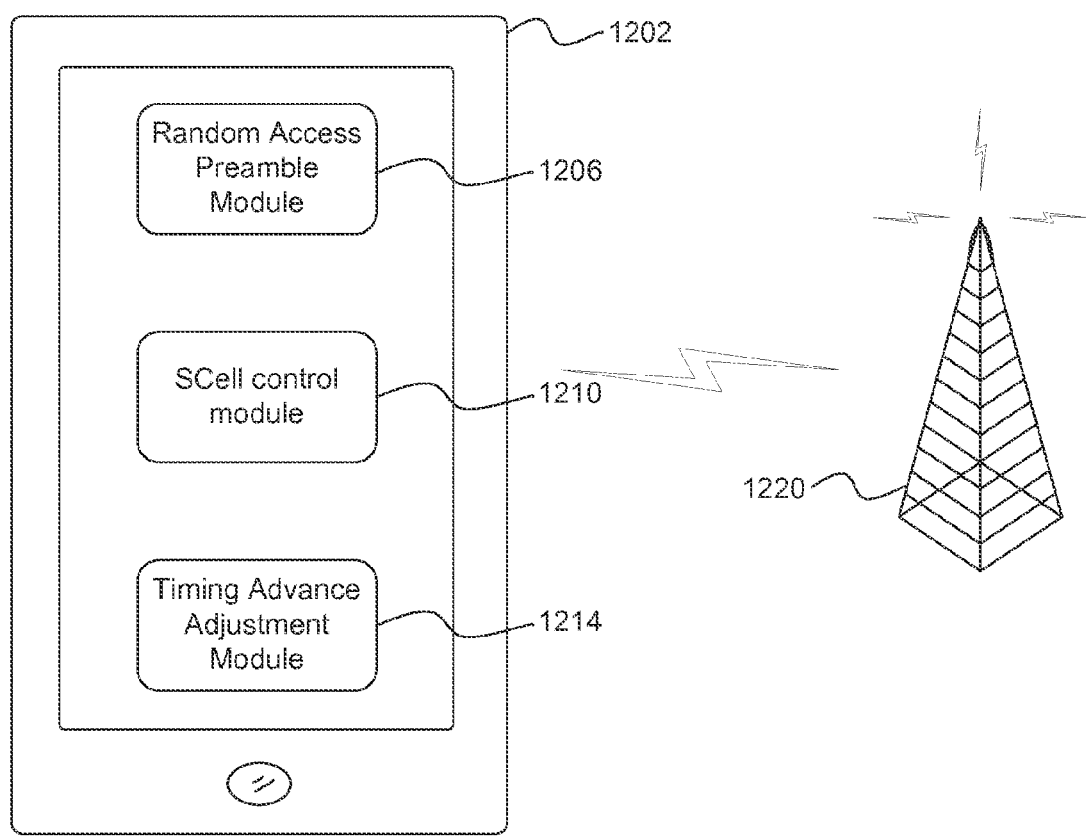
FIG. 12 illustrates a block diagram of a carrier aggregation timing advance system in accordant with an example.

In another embodiment, FIG. 12 illustrates a block diagram for a carrier aggregation timing advance system. The system comprises a random access preamble module 1206 at a User Equipment (UE) 1202 that is configured to generate a random access preamble and communicate the random access preamble in an uplink from the UE to an eNodeB 1220 via a component carrier for a Primary Serving Cell (PCell). The random access preamble communicated via the PCell can allow the eNodeB to determine a propagation distance from the HE to the eNodeB via the PCell.

A Secondary Serving Cell (SCell) control module 1210 at the UE 1202 is configured to receive a timing advance adjustment request for the SCell from the eNodeB 1220 and instruct the random access preamble module to generate a random access preamble and communicate the random access preamble in an uplink from the UE to the eNodeB via a component carrier for the SCell. The random access preamble communicated via the SCell can allow the eNodeB to determine a propagation distance from the HE to the eNodeB via the SCell.

A timing advance adjustment module 1214 at the UE 1202 is configured to receive a random access response (RAR) at the UE from the eNodeB for each random access preamble transmitted to the UE, wherein the RAR includes an 11-bit timing advance adjustment command generated by the eNodeB to adjust a timing for the component carrier associated with one of the PCell and the SCell. The timing can be adjusted based on the value of the 11-bit timing advance adjustment command that is determined by the eNodeB based on the propagation distance calculated at the eNodeB from the random access preamble.

Figure 13:
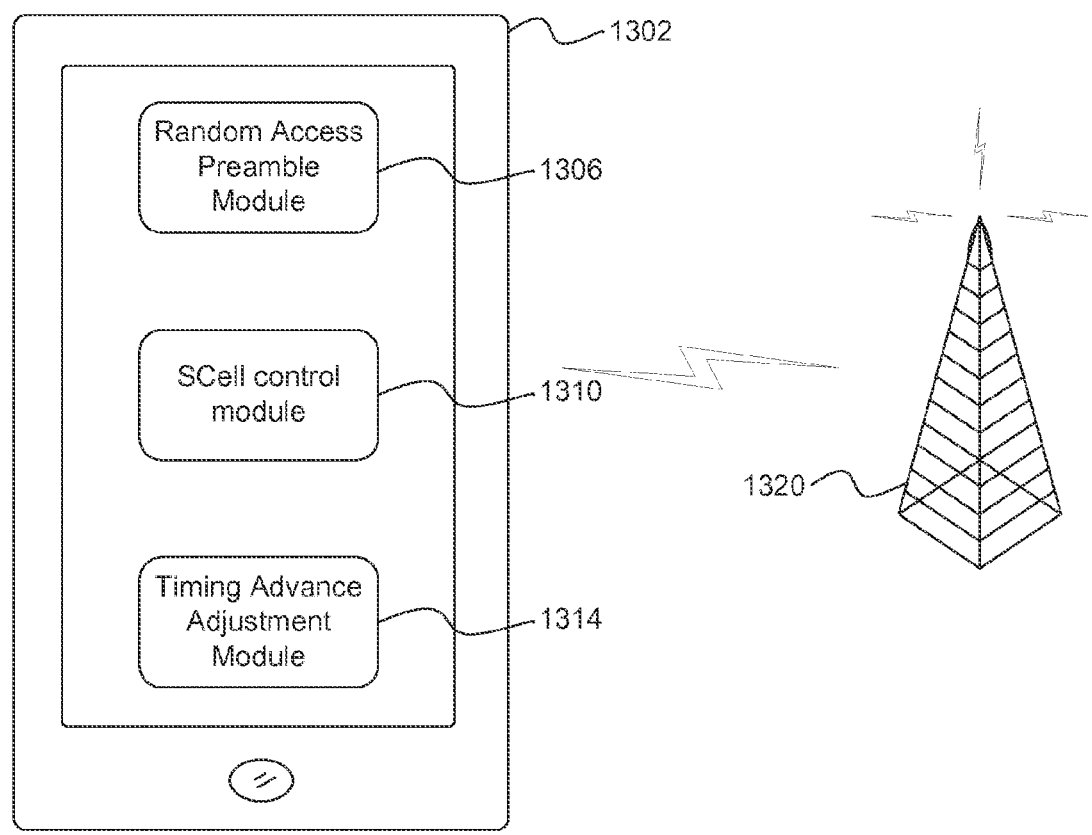
FIG. 13 illustrates a block diagram of an additional carrier aggregation timing advance system iii accordance with an example.

In another embodiment, FIG. 13 illustrates a block diagram for an alternative carrier aggregation timing advance system. The system comprises a random access preamble module 1306 at a User Equipment (UE) 1302 that is configured to generate a random access preamble and communicate the random access preamble in an uplink from the HE to an eNodeB 1320 via a component carrier for a Primary Serving Cell (PCell). The random access preamble communicated via the PCell can allow the eNodeB to determine a propagation distance from the UE to the eNodeB via the PCell.

The system further comprises a timing advance adjustment module 1314 at the UE 1302 that is configured to receive a random access response (RAR) at the UE from the eNodeB

1320 for the random access preamble transmitted to the UE, wherein the RAR includes an 11-bit timing advance adjustment command generated by the eNodeB to adjust a timing for the component carrier associated with the PCell and each component carrier associated with an SCell.

The system further comprises a Secondary Serving Cell (SCell) control module 1310 at the UE 1302 that is configured to receive a timing advance Medium Access Control (MAC) Control Element from the eNodeB 1320 that contains a minor timing advance adjustment instructing the UE to adjust a timing of the component carrier associated with a selected SCell. The minor timing advance adjustment may be performed multiple times to affect larger timing advance adjustment controls, as previously discussed.

Figure 14:
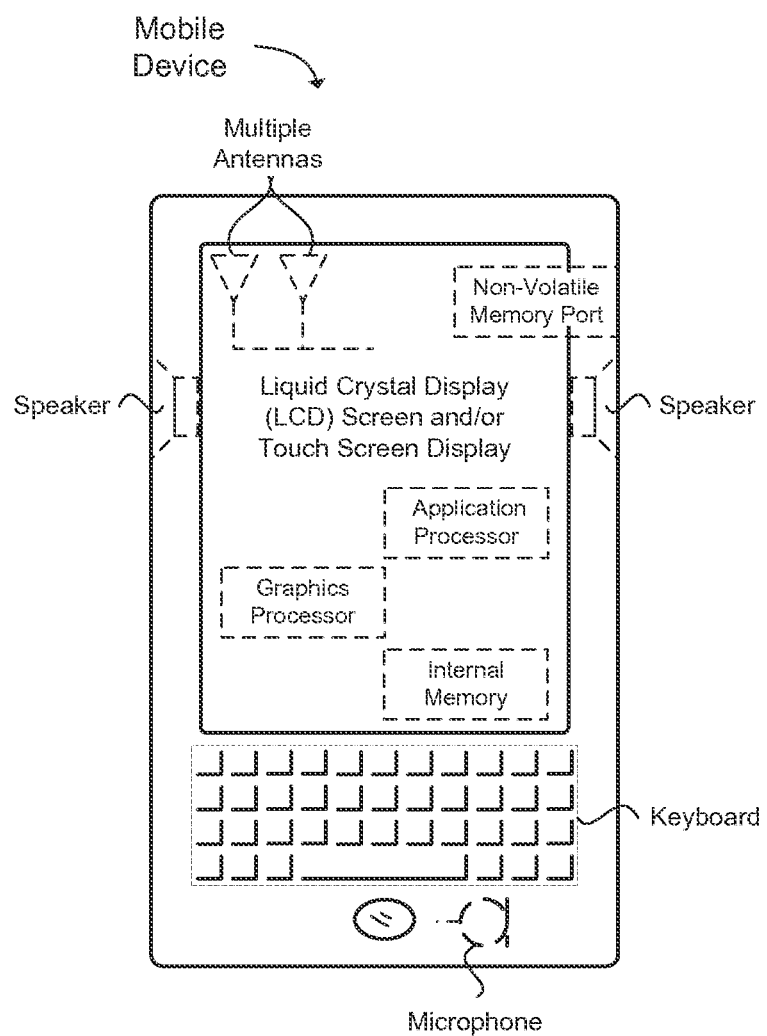
FIG. 14 illustrates a block diagram of a mobile communication device in accordance with an example.

FIG. 14 provides an example illustration of a mobile device, such as a user equipment (LTE), a mobile station (MS), a mobile wireless device, a mobile communication device, a tablet, a handset, or other type of mobile wireless device. The mobile device can include one or more antennas configured to communicate with a base station (BS), an evolved Node B (eNB), or other type of wireless wide area network (WWAN) access point. While two antennas are shown, the mobile device may have between one and four or more antennas. The mobile device can be configured to communicate using at least one wireless communication standard including Third. Generation Partnership Project Long Term Evolution (3GPP LTE), Worldwide interoperability for Microwave Access (WiMAX), High Speed Packet Access (HSPA), Bluetooth, WiFi, or other wireless standards. The mobile device can communicate using separate antennas for each wireless communication standard or shared antennas for multiple wireless communication standards. The mobile device can communicate in a wireless local area network (WLAN), a wireless personal area network (WPAN), and/or a wireless wide area network (WWAN).

FIG. 14 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present Invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing, from the principles and concepts of the invention. Accordingly, it is not intended that the invention be limited, except as by the claims set forth below.

What is claimed is:

1. A method for adjusting a timing of a wireless communication in a wireless communication system configured for carrier aggregation, comprising:
   communicating a random access preamble in an uplink from a user equipment (UE) to an eNodeB via a Primary Cell (PCell) associated with a selected component carrier of the carrier aggregation;
   receiving a Random Access Response (RAR) at the UE from the eNodeB for the PCell, wherein the RAR contains a timing advance adjustment instructing the UE to adjust a timing of a PCell wireless communication;
   receiving a request at the UE to adjust a timing of a Secondary Cell (SCell) wireless communication associated with a second component carrier of the carrier aggregation;
   communicating a random access preamble in an uplink from the UE to the eNodeB via the SCell; and
   receiving an RAR at the UE from the eNodeB for the SCell, wherein the RAR contains a timing advance adjustment instructing the UE to adjust a timing of the SCell wireless communication.

2. The method of claim 1, further comprising receiving the request at the UE to adjust the timing of the SCell after the SCell is activated at the UE.

3. The method of claim 1, further comprising receiving the request at the UE to adjust the timing of the SCell communication via a physical downlink control channel (PDCCH) sent on the PCell.

4. The method of claim 3, further comprising receiving the request via the PDCCH, wherein the request includes an identification mechanism to identify which secondary cell the timing advance adjustment is for.

5. The method of claim 3, further comprising receiving the request via the PDCCH, wherein the request includes a 3 bit cell index used to indicate on which SCell to initiate a random access channel (RACH) procedure.

6. The method of claim 1, wherein receiving the RAR at the UE from the eNodeB for the PCell further comprises receiving an 11 bit timing advance in a Medium Access Control (MAC) RAR and a Cell Radio Network Temporary Identifier (C-RNTI) for the PCell.

7. The method of claim 1, wherein receiving the RAR at the UE from the eNodeB for the SCell further comprises receiving an 11 bit timing advance adjustment in a Medium Access Control (MAC) RAR, but not receiving a Cell Radio Network Temporary Identifier (C-RNTI) for the SCell.

8. The method of claim 1, wherein receiving the RAR at the UE from the eNodeB for the SCell further comprises receiving the RAR at the UE via at least one of the SCell and the PCell.

9. The method of claim 1, further comprising maintaining a timing advance adjustment at the SCell by receiving a timing advance Medium Access Control (MAC) Control Element that contains a minor timing advance adjustment instructing the UE to adjust a timing of the SCell wireless communication.

10. The method of claim 9, further comprising receiving the MAC Control Element, wherein the Control Element includes an octet comprising a 6-bit timing advance adjustment command and two bits to indicate a cell index associated with a specific SCell or a Timing Advance (TA) index value.

11. The method of claim 9, further comprising receiving the MAC Control Element, wherein the MAC Control Element includes a first octet comprising a 6 bit timing advance adjustment and a second octet comprising a 3 bit identification value used to identify at least one of an SCell, a group of SCells, and a Timing Advance index value.

12. The method of claim 1, further comprising:
   communicating a random access preamble in an uplink from the UE to the eNodeB via an additional SCell; and
   receiving an RAR at the UE from the eNodeB for the additional SCell, wherein the RAR contains a timing advance adjustment instructing the UE to adjust a timing of an additional SCell wireless communication.

13. A computer program product, comprising a non-transitory computer readable storage medium having a computer readable program code embodied therein, the computer readable program code, when executed by a processor implements the method of claim 1.

14. A method for performing a timing advance adjustment on a wireless communication in a wireless communication system configured for carrier aggregation, comprising:
   receiving a random access preamble in an uplink from a user equipment (UE) at an eNodeB via a Primary Cell (PCell) associated with a selected component carrier of the carrier aggregation;
   transmitting a Random Access Response (RAR) from the eNodeB to the UE for the PCell and at least one SCell associated with an additional component carrier of the carrier aggregation, wherein the RAR contains a timing advance adjustment instructing the UE to adjust a timing of a PCell wireless communication and at least one SCell wireless communication based on a propagation distance of the UE to the eNodeB via the PCell;
   detecting a timing of the PCell wireless communication and the at least one SCell wireless communication at the eNodeB; and
   transmitting a separate timing advance Medium Access Control (MAC) Control Element (CE) to the UE for the PCell and the at least one SCell, wherein each separate timing advance MAC CE contains a minor timing advance adjustment instructing the UE to adjust a timing of a PCell wireless communication and the at least one SCell wireless communication based on the detected timing.

15. The method of claim 14, further comprising transmitting the MAC Control Element, wherein the Control Element includes an octet comprising a 6 bit timing advance adjustment and two bits to identify at least one of the PCell, the SCell, a group of SCells, and a timing advance (TA) index value.

16. The method of claim 14, further comprising transmitting the MAC Control Element, wherein the Control Element includes a first octet comprising a 6 bit timing advance adjustment and a second octet comprising a 3 bit cell identification value used to identify at least one of the PCell, the SCell, a group of SCells, and a timing advance (TA) index value.

17. The method of claim 14, wherein transmitting the Random Access Response (RAR) from the eNodeB to the UE for the PCell and the at least one SCell further comprises transmitting the RAR to the UE via at least one of the PCell wireless Communication on the selected component carrier and the at least one SCell wireless communication on the additional component carrier.

18. The method of claim 14, wherein transmitting the separate timing advance Medium Access Control (MAC) Control Element (CE) to the UE for the PCell and the at least one SCell further comprises transmitting each separate MAC CE to the UE via at least one of the PCell wireless Communication on the selected component carrier and the at least one SCell wireless communication on at least one additional component carrier.

19. The method of claim 14, further comprising:
    detecting the timing of the PCell wireless communication and the at least one SCell wireless communication at the eNodeB after the timing advance adjustment is performed; and
    transmitting an additional timing advance Medium Access Control (MAC) Control Element (CE) to at least one of the UE for the PCell and the at least one SCell to perform an additional timing advance adjustment when the detected timing is off my more than a predetermined amount.

20. The method of claim 14, wherein the timing advance adjustment comprises adjusting a timing of at least one of the PCell wireless communication and the at least one SCell wireless communication in a positive or negative direction relative to a clock in the eNode B.

21. A computer program product, comprising a non-transitory computer readable storage medium having a computer readable program code embodied therein, the computer readable program code when executed by a processor to implement the method of claim 14.

22. A carrier aggregation timing advance system, comprising:
    a memory comprising instructions;
    a processor executing the instructions;
    the instructions comprising:
    a random access preamble module at a User Equipment (UE), that is configured to generate a random access preamble and communicate the random access preamble in an uplink from the UE to an eNodeB via a component carrier for a Primary Serving Cell (PCell);
    a Secondary Serving Cell (SCell) control module at the UE, that is configured to receive a timing advance adjustment request for the SCell from the eNodeB and instruct the random access preamble module to generate a random access preamble and communicate the random access preamble in an uplink from the UE to the eNodeB via a component carrier for the SCell; and
    a timing advance adjustment module at the UE, that is configured to receive a random access response at the UE from the eNodeB for each random access preamble transmitted from the UE, wherein the RAR includes an 11-bit timing advance adjustment command generated by the eNodeB to adjust a timing for the component carrier associated with one of the PCell and the SCell.

23. The system of claim 22, wherein the timing advance module is further configured to maintain a timing advance adjustment at the SCell by receiving a timing advance Medium Access Control (MAC) Control Element from the eNodeB that contains a minor timing advance adjustment instructing the UE to adjust a timing of the component carrier associated with the SCell.

24. The system of claim 23, wherein the MAC Control Element includes an octet comprising a 6 bit timing advance adjustment and two bits to identify at least one of the PCell, the SCell, a group of SCells, and a timing advance (TA) index value.

25. The system of claim 23, wherein the MAC Control Element includes a first octet comprising a 6 bit timing advance adjustment and a second octet comprising a 3 bit cell identification value used to identify at least one of the PCell, the SCell, a group of SCells, and a timing advance (TA) index value.

26. The system of claim 23, wherein the UE is configured to connect to at least one of a wireless local area network (WLAN), a wireless personal area network (WPAN), and a wireless wide area network (WWAN), wherein the mobile device includes an antenna, a touch sensitive display screen, a speaker, a microphone, a graphics processor, an application processor, internal memory, a non-volatile memory port, or combinations thereof.

27. A carrier aggregation timing advance system, comprising:
    a memory comprising instructions;
    a processor executing the instructions;
    the instructions comprising:
    a random access preamble module at a User Equipment (UE), that is configured to generate a random access preamble and communicate the random access preamble in an uplink from the UE to an eNodeB via a component carrier for a Primary Serving Cell (PCell);
    a timing advance adjustment module at the UE, that is configured to receive a random access response (RAR) at the UE from the eNodeB for the random access preamble transmitted from the UE, wherein the RAR includes an 11-bit timing advance adjustment command generated by the eNodeB to adjust a timing for the component carrier associated with the PCell and each component carrier associated with an SCell; and
    a Secondary Serving Cell (SCell) control module at the UE, that is configured to receive a timing advance Medium Access Control (MAC) Control Element from the eNodeB that contains a minor timing advance adjustment instructing the UE to adjust a timing of the component carrier associated with a selected SCell.

28. The system of claim 27, wherein the MAC Control Element includes an octet comprising a 6 bit timing advance adjustment and two bits to identify at least one of the PCell, the SCell, a group of SCells, and a timing advance (TA) index value.

29. The system of claim 27, wherein the MAC Control Element includes a first octet comprising a 6 bit timing advance adjustment and a second octet comprising a 3 bit cell identification value used to to identify at least one of the PCell, the SCell, a group of SCells, and a timing advance (TA) index value.

30. The system of claim 27, further wherein the UE is configured to connect to at least one of a wireless local area network (WLAN), a wireless personal area network (WPAN), and a wireless wide area network (WWAN), wherein the mobile device includes an antenna, a touch sensitive display screen, a speaker, a microphone, a graphics processor, an application processor, internal memory, a non-volatile memory port, or combinations thereof.

* * * * *